(12) United States Patent
Hur et al.

(10) Patent No.: US 9,939,677 B2
(45) Date of Patent: Apr. 10, 2018

(54) BACK LIGHT UNIT AND LIQUID CRYSTAL DISPLAY USING THE SAME

(75) Inventors: Sic Hur, Seoul (KR); Peng Sam Park, Seoul (KR); Tae Oun Jung, Seoul (KR); Kwang Ho Park, Seoul (KR); Moo Ryong Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 41 days.

(21) Appl. No.: 13/997,112

(22) PCT Filed: Aug. 23, 2011

(86) PCT No.: PCT/KR2011/006213
§ 371 (c)(1),
(2), (4) Date: Aug. 22, 2013

(87) PCT Pub. No.: WO2012/086896
PCT Pub. Date: Jun. 28, 2012

(65) Prior Publication Data
US 2013/0335672 A1 Dec. 19, 2013

(30) Foreign Application Priority Data
Dec. 23, 2010 (KR) .................. 10-2010-0133431

(51) Int. Cl.
*G02F 1/1335* (2006.01)
*F21V 8/00* (2006.01)

(52) U.S. Cl.
CPC ..... *G02F 1/133605* (2013.01); *G02B 6/0023* (2013.01); *G02B 6/0073* (2013.01);
(Continued)

(58) Field of Classification Search
CPC .. G02B 6/0023; G02B 6/0065; G02B 6/0073; G02F 1/1336; G02F 1/133605;
(Continued)

(56) References Cited

U.S. PATENT DOCUMENTS 5,408,387 A * 4/1995 Murase ............ B29D 11/00278
362/327
6,086,795 A * 7/2000 Hatton ......................... 252/582
(Continued)

FOREIGN PATENT DOCUMENTS

| JP | 2009-026554 A | 2/2009 |
| JP | 2009-037204 A | 2/2009 |

(Continued)

OTHER PUBLICATIONS

International Search Report in International Application No. PCT/KR2011/006213, filed Aug. 23, 2011.
(Continued)

*Primary Examiner* — Sophie Hon
(74) *Attorney, Agent, or Firm* — Saliwanchik, Lloyd & Eisenschenk

(57) ABSTRACT

Provided is a back light unit comprising a plurality of LED light source formed on a printed circuit board and a resin layer which is laminated on the LED light source and forwardly induces diffusion of the emitted light wherein the resin layer is made of synthetic resin comprising an oligomer. According to the present invention, an essential light guide plate for a general back light unit configuration is removed and a resin layer mainly consisting of an oligomer is used to guide the light source, and thereby decreasing the number of the light source, minimizing luminance variation when the unit is lighted at a high temperature and kept it for a predetermined time period, and implementing excellent heat-resistant property and optical property.

13 Claims, 5 Drawing Sheets

(52) U.S. Cl.
CPC ...... *G02F 1/133603* (2013.01); *G02B 6/0065* (2013.01); *G02F 1/133606* (2013.01); *G02F 2202/023* (2013.01); *G02F 2202/28* (2013.01)

(58) Field of Classification Search
CPC ......... G02F 1/133606; G02F 1/133615; G02F 2202/023; G02F 2202/28; Y10T 428/1036; Y10T 428/105
USPC ........................................ 428/1.1; 349/62–67
See application file for complete search history.

(56) References Cited

U.S. PATENT DOCUMENTS

| | | | | |
|---|---|---|---|---|
| 6,358,606 | B1* | 3/2002 | Sakai | B32B 7/12 427/516 |
| 6,676,795 | B1* | 1/2004 | Levandoski | 156/272.2 |
| 7,951,866 | B2 | 5/2011 | Nakabayashi | |
| 7,989,563 | B2 | 8/2011 | Nakabayashi et al. | |
| 2006/0285322 | A1 | 12/2006 | Hasei et al. | |
| 2008/0247191 | A1 | 10/2008 | Hsu | |
| 2009/0209718 | A1* | 8/2009 | Nakabayashi et al. | 526/325 |
| 2010/0265694 | A1 | 10/2010 | Kim et al. | |
| 2011/0026269 | A1* | 2/2011 | Oh | G02B 6/0021 362/607 |

FOREIGN PATENT DOCUMENTS

| | | |
|---|---|---|
| JP | 2009301972 A | 12/2009 |
| KR | 10-2008-0061824 A | 7/2008 |
| KR | 10-2009-0001104 A | 1/2009 |
| KR | 10-2009-0057992 A | 6/2009 |
| KR | 10-2009-0090272 A | 8/2009 |
| KR | 10-0930914 B1 | 12/2009 |
| KR | 10-2010-0070469 A | 6/2010 |
| KR | 10-2011-0097302 A | 8/2011 |
| KR | 10-2011-0104400 A | 9/2011 |
| TW | 200936726 A | 9/2009 |
| WO | WO-2010005810 A2 | 1/2010 |

OTHER PUBLICATIONS

Office Action dated Mar. 27, 2015 in Chinese Application No. 201180068380.7.
Extended European Search Report dated Aug. 20, 2015 in European Application No. 11851610.3.
Office Action dated Apr. 25, 2013 in Korean Application No. 10-2012-0017366.

* cited by examiner

[Fig. 1]
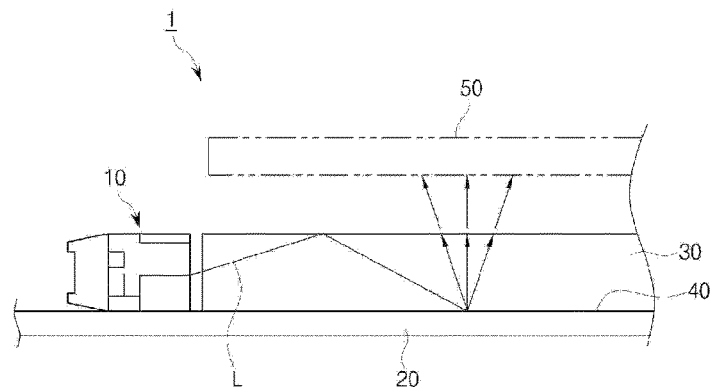
[Fig. 2]
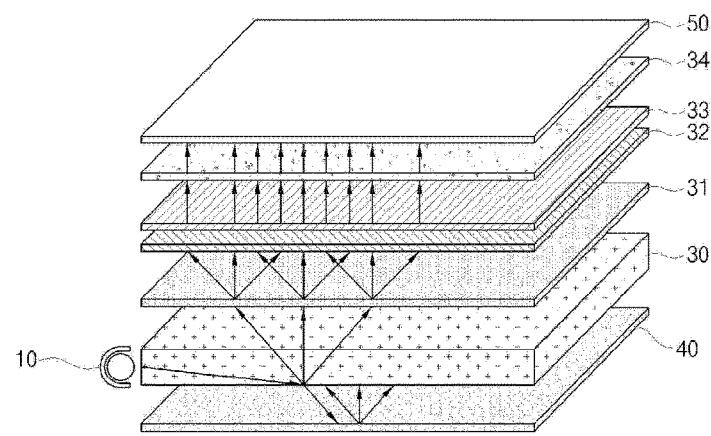
[Fig. 3]
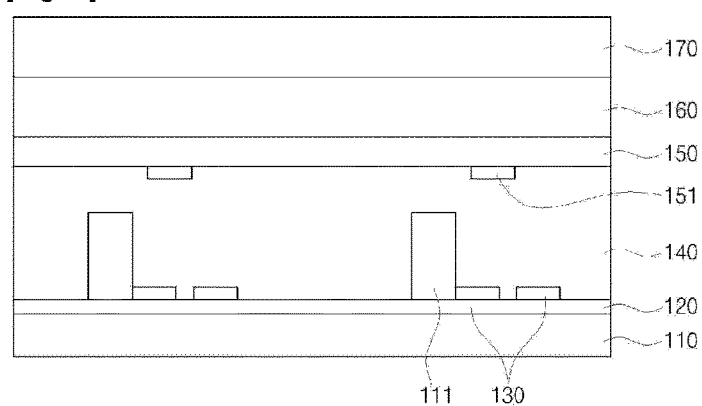
[Fig. 4]
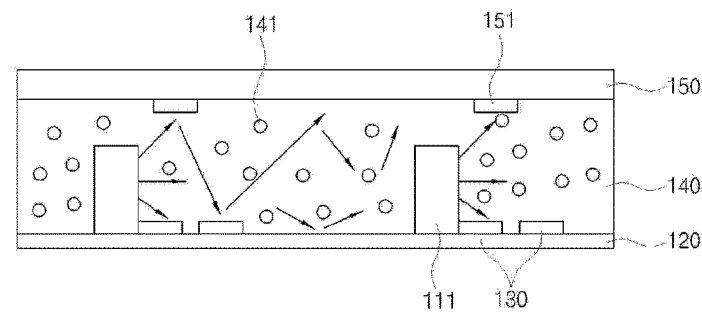

[Fig. 5]

| Composition | Component | Rate(%) | Detail |
|---|---|---|---|
| RESIN | U/T acrylate oligomer | 10~21 | Synthetic Oligomer |
| | | | Synthetic Oligomer |
| MONOMER | IBOA (Isobornyl Acrylate) | 10~21 | Diluted-type reactive monomer of low boiling point |
| | HBA (Hydroxybutyl Acrylate) | 10~21 | Diluted-type reactive monomer of low boiling point |
| | HEMA (Hydroxy Metaethyl Acrylate) | 10~21 | Diluted-type reactive monomer of low boiling point |
| | | | |
| ADDITIVE | Photo initiator (1-hydroxycyclohexyl phenyl-ketone) | 1~5 | Photo-reactive initiator |
| | Diphenyl (2,4,6-trimethylbenzoyl) phosphine oxide | 0.5~1 | Photo-reactive initiator |
| Summation | | 100% | |

[Fig. 6]

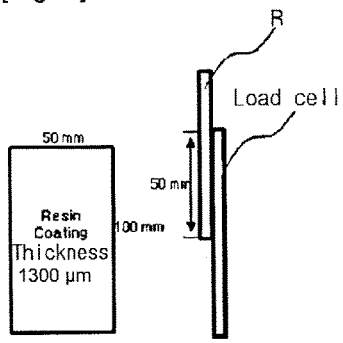

[Fig. 7]

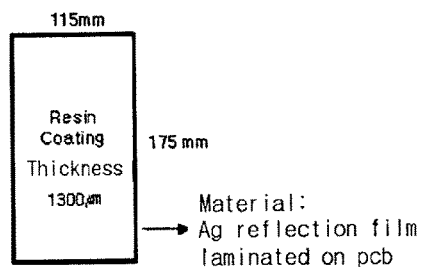

[Fig. 8]

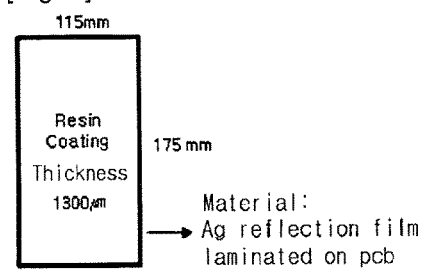

[Fig. 9]
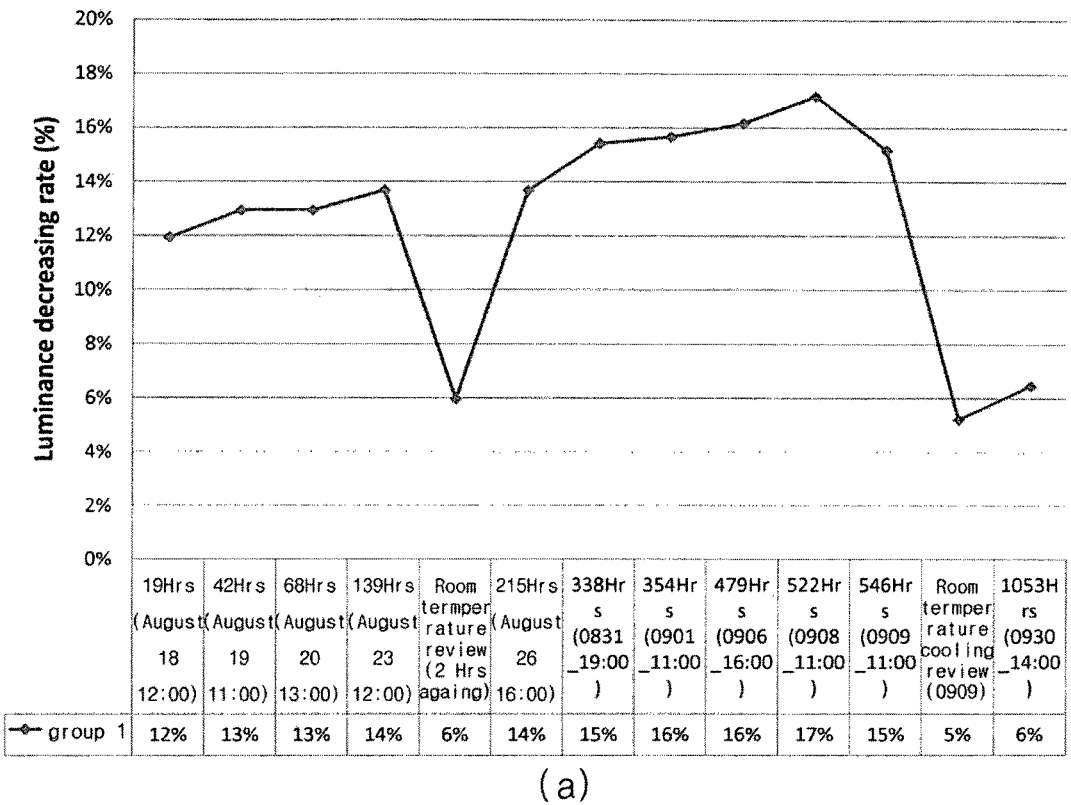
(a)
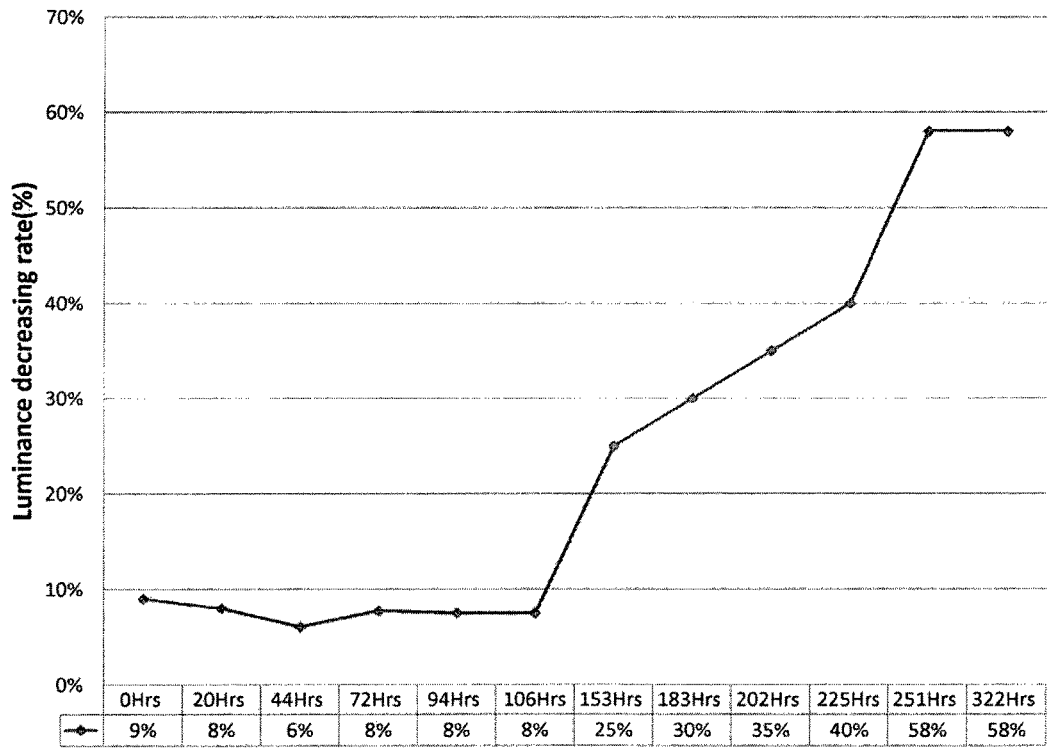
(b)

[Fig. 10]
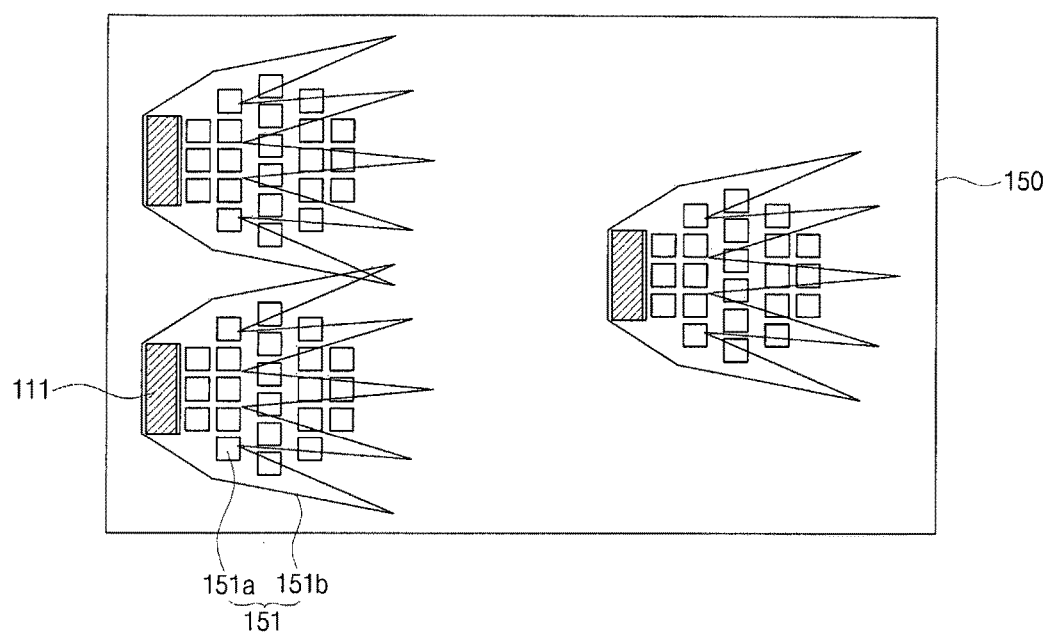

[Fig. 11]
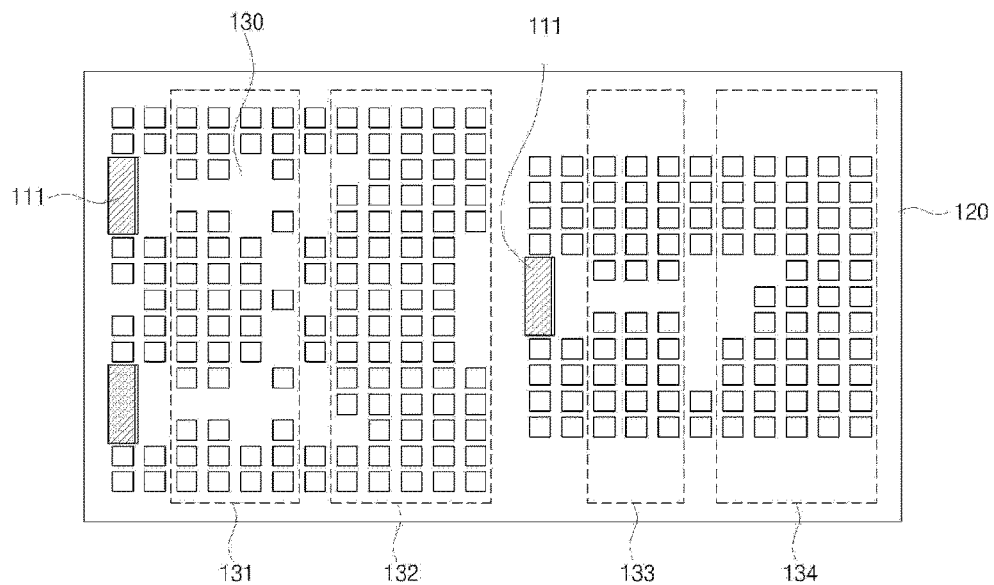
[Fig. 12]
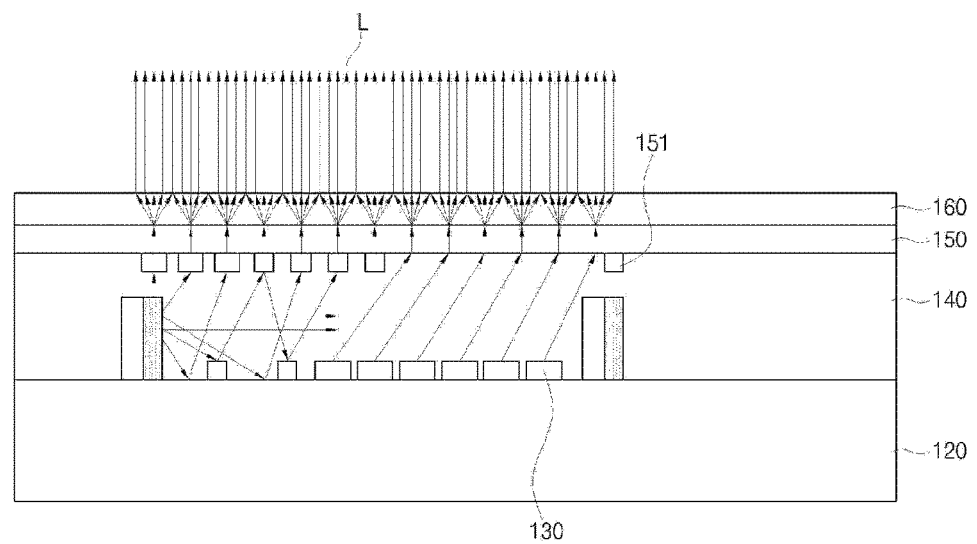

BACK LIGHT UNIT AND LIQUID CRYSTAL DISPLAY USING THE SAME

CROSS-REFERENCE TO RELATED APPLICATIONS

This application is the U.S. national stage application of International Patent Application No. PCT/KR2011/006213, filed Aug. 23, 2011, which claims priority to Korean Application No. 10-2010-0133431, filed Dec. 23, 2010, the disclosures of each of which are incorporated herein by reference in their entirety.

TECHNICAL FIELD

The present invention relates to a backlight unit and a liquid crystal display using the backlight unit in which a light guide plate is removed and thereby thinning the backlight unit and ensuring light efficiency.

BACKGROUND ART

In general, a liquid crystal display (LCD) refers to as a display device in which by separately supplying data signals according to image information to pixels arranged in a matrix type and adjusting light transmission rates of the pixels, images can be adjusted to desired images wherein since it does not self-emit light, a back light unit is arranged on a rear surface thereof to display images.

Referring to FIG. 1, in the back light unit 1, a flat-light guide plate 30 is arranged on a substrate 20 and a plurality of side view LEDs 10 (only one shown) are arranged as an array type on a side of the light guide plate 30.

In the LED 10, light L entered to the light guide plate 30 is reflected upwardly from fine reflection patterns or a reflection sheet 40 provided at a bottom of the light guide plate 30 and is emitted from the light guide plate 30 to provide back light to a LCD panel 50 disposed on a upper part of the light guide plate 30. As shown in FIG. 2, in the back light unit as described above, a plurality of optical sheets such as a diffusion sheet 31, prism sheets 32 and 33 and a protection sheet 35, etc., may be further provided between the light guide plate 30 and the LCD panel 50.

The back light unit serves to evenly emit light for displaying image on a rear surface of LCD which does not spontaneously emit light. Further, the light guide plate is a kind of plastic formation lens and serves to uniformly transfer light emitted from a light source (LED) to the entire surface of LCD for providing even luminance and lighting to the back light unit. Accordingly, this light guide plate is basically used as an essential element for the back light unit; however, there is a limitation to thinning a thickness of the back light unit due to its own thickness of the light guide plate. Specially, in a case of the back light unit of a large area, an image quality is degraded.

DISCLOSURE OF INVENTION

Technical Problem

The present invention has been proposed to solve the above drawbacks and an object of the present invention relates to provide a back light unit in which an essential light guide plate for a general back light unit configuration is removed and a resin layer mainly consisting of an oligomer is used to guide the light source, and thereby decreasing the number of the light source, minimizing luminance variation when the unit is lighted at a high temperature, and implementing excellent heat-resistant property and optical property.

Further, another object of the present invention relates to provide a back light unit and a liquid crystal display using the back light unit in which a tensile strength, reliability of constant temperature and humidity, and heat-resistant reliability are ensured in the products and degree of freedom is increased in the back light unit by thinning entire thickness of a back light unit.

Solution to Problem

According to an embodiment of the present invention, provided is a back light unit comprising: a plurality of LED light sources formed on a printed circuit board; and a resin layer which is laminated on the printed circuit board and forwardly induces diffusion of the emitted light wherein the resin layer is formed with synthetic resin comprising oligomer.

The resin layer may include the oligomer, monomer and additives.

The oligomer may be urethane acrylate oligomer.

The monomer may include a mixture comprising IBOA (isobornyl Acrylate) of 10-21%, HBA (Hydroxybutyl Acrylate) of 10-21% and HEMA (Hydroxy Metaethyl Acrylate) of 10-21%.

The additives may be a mixture comprising the photo initiator of 1-5% and the anti-oxidant of 0.5-1% on the basis of the total weight of the resin layer.

In the back light unit according to the present invention, the LED light source is a side view light emitting diode (LED), and a reflection film which is laminated on an upper surface of the printed circuit board and on which reflection patterns are formed.

In the back light unit according to the present invention, a diffusion plate which is formed on an upper surface of the resin layer and on which an optical pattern for shielding or reflecting light are printed may be further provided.

Specially, the resin layer may comprise beads of 0.01-0.3 wt % on the basis of the total weight of the resin layer for increasing light reflection.

In addition, the optical pattern is formed as an overlapped configuration of a diffusion pattern formed using a light shielding ink comprising one or more selected from a group consisting of $TiO_2$, $CaCO_3$, $BaSO_4$, $Al_2O_3$ and Silicon, and a light shielding pattern formed using a light shielding ink comprising Al or a mixture of Al and $TiO_2$.

The reflection patterns may be formed using a reflection ink comprising one of $TiO_2$ and $Al_2O_3$.

A liquid crystal display may be implemented using the back light unit according to the present invention. Specially, a side view LED is used as a light source and the resin layer of the present invention laminated for receiving the light source is used as a light guide plate wherein the liquid crystal display is provided with a back light unit comprising: a reflection film laminated on a upper surface of the printed circuit board, on which reflection patterns are formed; and a diffusion plate formed on a upper surface of the resin layer on which optical patters for shielding or reflecting emitted light are printed. Here, the back light unit further comprises prism sheets or protection sheets laminated on an upper part of the diffusion plate.

Advantageous Effects Of Invention

According to the present invention, an essential light guide plate for a general back light unit configuration is removed and a resin layer mainly consisting of an oligomer is used to guide the light source, and thereby decreasing the number of the light source, minimizing luminance variation when the unit is lighted at a high temperature and kept it for a predetermined time period, and implementing excellent heat-resistant property and optical property.

BRIEF DESCRIPTION OF DRAWINGS

The above and other aspects, features and advantages of certain exemplary embodiments of the present invention will be more apparent from the following description taken in conjunction with the accompanying drawings, in which:

FIGS. 1 and 2 are views schematically illustrating a configuration of a back light unit according to a prior art, respectively;

FIG. 3 is a view illustrating a main configuration of a back light unit according to the present invention;

FIG. 4 is a view illustrating operational states of functions of a resin layer and beads of the back light unit according to the present invention;

FIG. 5 is an implementing example of compositions consisting of the resin layer according to the present invention;

FIGS. 6-8 are views illustrating characteristic comparison of experimental data of a resin layer according to the present invention and a resin layer formed with a general polymer;

FIG. 9(*a*) and FIG. 9(*b*) are graphs illustrating luminance changing rates of the back light unit according to the present invention and a general back light unit when they are operated at a high temperature;

FIG. 10 is a view illustrating optical patterns according to the present invention;

FIG. 11 is a view illustrating reflection patterns according to the present invention;

FIG. 12 is a view illustrating an operational state of the back light unit according to the present invention.

REFERENCE NUMERALS

110: printed circuit board
111: LED light source
120: reflection film
130: reflection pattern
140: resin layer
150: diffusion plate
151: optical pattern
151*a*: diffusion pattern
151*b*: light shielding pattern
160: prism sheet

BEST MODE FOR CARRYING OUT THE INVENTION

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

A gist of the present invention relates to provide a back light unit in which a light guide plate is removed from a prior back light unit and it is formed with a resin layer mainly consisting of an oligomer and thereby minimizing luminance variations at a high temperature and decreasing greatly a thickness of a whole back light unit and further the number of a light source.

FIG. 3 and FIG. 4 are views illustrating main constitutional elements of the back light unit according to the present invention.

Referring to FIG. 3, the back light unit according to the present invention includes a plurality of LED light sources 130 formed on a printed circuit board 110 and the resin layer 140 laminated on the printed circuit board in the structure of burying the LED light source 130. Specially, the resin layer may be formed preferably with synthetic resin comprising a synthetic oligomer.

Further, in the back light unit according to the present invention, at least one or more of LED light sources 111 are arranged on the printed circuit board 110 to emit light. In this case, the LED may include a top view LED and a side view LED, and more preferably it may include the side view LED. That is, the light source using the side view LED may be used, through which the light emitted from the LED light source 111 is not emitted right upwardly and but emitted toward side thereof.

Here, the LED may be arranged in a direct-type, using the side view LED wherein the number of total light source can be decreased and total thickness of the back light unit can be decreased greatly by using the resin layer implementing light diffusion and reflection functions.

The resin layer 140 is laminated to bury the LED light source 111 and serves to diffuse light emitted sideward from the light source.

That is, a function of a prior light guide plate is performed through the resin layer 140. Here, it has to be understood that any resin material capable of diffusing light may be used for the resin layer.

FIG. 4 is a view illustrating a configuration of a back light unit as shown in FIG. 3, including beads 141. The beads may further diffuse light of the resin layer.

FIG. 5 is a table of one preferable example of a composition forming the resin layer according to the present invention.

According to an embodiment of the present invention, a resin mainly consisting of urethane acrylate oligomer (oligomer type) may be used for the resin layer. For example, urethane acrylate oligomer of synthetic oligomer may be used.

Of course, the resin material may further comprise a monomer mixed with IBOA (isobornyl acrylate), HBA (Hydroxybutyl Acrylate) and HEMA (Hydroxy Metaethyl Acrylate) of diluted-type reactive monomer of low boiling point and may comprise a photo initiator (for example, 1-hydroxycyclohexyl phenyl-ketone, Diphenyl), Diphenyl (2,4,6-trimethylbenzoyl phosphine oxide) or antioxidants as additives.

In more detail, the resin layer may be formed with a composition comprising oligomer, monomer and additives.

In this case, the monomer may be formed with a mixture of IBOA (isobornyl Acrylate) of 10-21%, HBA (Hydroxybutyl Acrylate) of 10-21% and HEMA (Hydroxy Metaethyl Acrylate) of 10-21%.

The additives may be formed by mixing the photo initiator of 1-5% to initiate a photo-reaction, or mixing the anti-oxidant of 0.5-1% to improve a yellowness phenomenon.

By forming a resin layer of UV resin using the composition as described above, instead of the light guide plate, the same effects as the light guide plate can be obtained and further a refraction rate and a thickness of the back light unit can be adjusted. At this time, all of an adhering property, reliability and mass production speed can be satisfied, using the composition as described above.

Specially, the resin layer according to the present invention may be preferably formed through the following processes.

That is, the resin layer according to the present invention may be mainly formed with urethane acrylate oligomer and be mainly-reacted in an UV curing wavelength of 300-350 μm or in a wavelength of 400 μm using mercury lamp or metal (gallium) lamp, and a second low pressure curing process is performed thereto wherein N2 is inputted during the second low pressure curing process to increase a surface-adhering force and a curing rate for adjusting a curing balance and thereby the resin layer is flexible and has excellent adhering force, and overcoming a limitation of the light guide plate by keeping a refraction rate of PMMA (polymethymethacrylate).

Specially, in a case wherein nitrogen purging is not performed when the oligomer is cured, surface wrinkles and cracks may be occurred due to unbalance of internal curing and surface curing and thus it preferably allows rapid curing to be performed through the nitrogen purging even in general metal halide.

In the following, as shown in FIG. 5, the characteristics comparison of the resin layer mixed with monomer mainly consisting of oligomer according to the present invention and a resin layer made of only polymer will be described.

Mode For The Invention

1. Adhering Force (Tensile Strength) Reliability Test

A tensile strength of a resin layer was tested using a thin film tensile strength tester (from Intron company of US) wherein the resin layer having a coating of an area of Width×length
of 50 mm×100 mm and a thickness of 1300 μm was formed on upper and lower grips of the tester, and when the upper grip rose, weight loaded on a load cell was measured in and compared in real time (see FIG. 6). (test condition was 0.1 m/min)

TABLE 1

|  | Present invention (Oligomer type) | Comparison example (Polymer type) |
|---|---|---|
| Tensile strength | 10N/in$^2$ | 17N/in$^2$ |

Referring to the above test results, a tensile strength of the resin layer of the single oligomer type was lower than that of a resin layer of the polymer type, but optical characteristics such as luminance variation rate was good as will be described later.

2. Constant Temperature and Humidity Reliability Test

This test was performed using Temperature Humidity Bias (THB) and THB-SH-641 (from ESPEC company of JP) by applying a constant temperature and humidity to the resin layer and comparing constant temperature and humidity characteristics of the results therefrom. Here, test conditions were given as a temperature of 60° C. and humidity of 95% for 1000 hr and then characteristics was compared. Here, as shown in FIG. 2, a reflection film was provided on the printed circuit board and the resin layer was formed on the reflection film. Further, the resin layer having a coating of an area of width×length of 115 mm×175 mm and a thickness of 1300 μm was formed on the reflection film and a test was performed under the conditions to the resin layer, and then appearance was observed and a lighting test was performed to compare the results (see FIG. 7).

TABLE 2

|  | Present invention (Oligomer type) | Comparison example (Polymer type) |
|---|---|---|
| Constance temperature and humidity (1000 hr) | No appearance abnormality Good adhering | Yellowness phenomenon occurred on the entire surface White phenomenon occurred No good adhering |

Referring to table 2, there was no appearance abnormality and no variation of adhering extent in the oligomer type resin layer according to the present invention, however, yellowness phenomenon was occurred on the entire surface of the polymer type resin layer having a polymer only and further the adhering property was poor.

3. Heat-resistant Property Reliability Test

A heat-resistant property of the product was evaluated and compared by applying a predetermined amount of heat to the resin layer for a predetermined time period in an oven of HT330 (from ETAC company of JP). Here, the heat was applied at a temperature of 80° C. for 240 hr and then the heat-resistant property and adhering property were compared. Further, a coating having a thickness of 1300 μm and an area of width×length of 115 mm×175 mm is formed on the reflection film and then a test was performed under the conditions to the resin layer, and then appearance was observed and a lighting test was performed to compare the results (see FIG. 8).

TABLE 3

|  | Present invention (Oligomer type) | Comparison example (Polymer type) |
|---|---|---|
| Constance temperature and humidity (240 hr) | No appearance abnormality Good adhering | Yellowness phenomenon occurred on the entire surface |

In the above test, there was no appearance abnormality and no variation of adhering extent in the oligomer type resin layer according to the present invention, however, yellowness phenomenon was occurred on the entire surface of the polymer type resin layer having an polymer only and further the adhering property was poor.

In comparisons of the above 3 characteristics tests, the resin layer having the composition mainly consisting of the oligomer according to the present invention has been confirmed to have better tensile strength, constant temperature and humidity property, heat-resistance, reliability, and adhering property than those of the single resin layer.

4. Luminance Variation Test Under a High Temperature Operation

FIG. 9 shows comparison of the experimental results of (a) the back light unit provided with the resin layer according to the present invention and (b) the back light unit provided with the polymer type resin layer for a general optics.

Specially, it is shown experimental results from that a resin layer mainly consisting of the oligomer according to the present invention and the resin layer formed of the polymer were provided to the back light configuration according to the present invention as shown in FIG. 3 wherein the back light unit light source was lighted at 60° C.

and left it for 1000 hr in order to perform a high temperature lighting reliability test. As shown in FIG. 9, in a case of the resin layer of the polymer for general optics as a graph (b), 52% luminance decreasing rate is shown after 300 hr elapses and leaves it at room temperature for 4 hr, however, in a case of the back light unit provided with the resin layer according to the present invention, only 6% luminance decreasing rate is shown after 1000 hr reliability lapses and leaves it at room temperature for 4 hr.

It is confirmed from these experimental results that it keeps an excellent heat-resistant property and an optical property after 1000 hr reliability test, comparing to the polymer type.

Referring to the configuration of the present invention as shown in FIGS. 3 and 4, the back light configuration according to the present invention, which is connected with the resin layer, will be described in detail.

In the back light unit of the present invention, a resin layer 140 may further include beads 141 for increasing light diffusion and reflection. The beads 141 may be employed in an amount of 0.01-0.3 wt % on the basis of the total weight of the resin layer. That is, light emitted sideward from LED is diffused and reflected through the resin layer 140 and the beads 141 proceeds upwardly, and in a case of providing a reflection film 120 and a reflection pattern 121, this reflection function may be accelerated. Here, one selected from a group consisting of silicon, silica, glass bubble, PMMA, urethane, Zn, Zr, Al2O3 and acryl may be used for the beads wherein a material for the beads may be transparent.

An existing of the resin layer may reduce greatly a thickness of a prior light guide plate and thereby thinning the product and making it flexible and applicable to a display device of a wide use.

Further, the reflection film 120 may be Ag film or white PET and may be provided with a reflection material for diffusing light emitted from the light source, and reflection patterns 121 through a whiter printing for accelerating the light diffusion. The reflection patterns may be printed using a reflection ink comprising one selected from a group consisting of TiO2, CaCO3, BaSO4, Al2O3, Silicon and PS.

Furthermore, the diffusion plate 150 may serve to diffuse light emitted through the resin layer 140 may be provided with optical patterns for implementing light shielding effect to some extent to avoid optical property being worse due to excessively strong of light intensity, or deducting yellow light. That is, the light shielding patterns may be printed using a light shielding ink in order for light not to be concentrated. Here, the optical patterns 151 may be printed on a upper or lower surface of the diffusion plate 150, and more preferably, it may be arranged in a light emission direction (front direction) from the LED light source 111 placed on a lower part of the diffusion plate. That is, the optical patterns may be on a vertical upper surface of the LED light source or a location corresponding to a light emission directional surface.

Here, the optical patterns may serve to partly shied instead of entirely shield light diffuse light and may control light shielding extent or diffusing extent as one optical pattern. Furthermore, the optical patterns may be formed as overlapped printing configuration of complex patterns.

The overlapped printing configuration refers to a configuration in which one pattern is formed and another pattern is printed over the pattern.

As one example of the overlapped printing configuration, with respect to implementing the optical pattern 151, referring to FIG. 10, a diffusion pattern 151a is formed on a lower surface of the diffusion plate in the light emission direction, using a light shielding ink comprising one or more selected from a group consisting of TiO$_2$, CaCO$_3$, BaSO$_4$, Al$_2$O$_3$ and Silicon, and a light shielding pattern 151b may be formed as overlapped configuration on the diffusion pattern, using the light shielding ink comprising Al or a mixture of Al and TiO$_2$. That is, the diffusion pattern 151a is formed on the surface of the diffusion plate by white-printing and then the light shielding pattern 151b is formed thereon, or reversely a dual configuration may be formed. Of course, it is obvious that variations of the patterns may be formed in a consideration of light efficiency, intensity and light shielding rate.

In addition, the light shielding pattern 151b of a metal layer may be formed as a middle layer among sequentially laminated configurations and then the diffusion pattern 151a may be formed on upper and lower surface of the light shielding pattern as a triple layer. In this triple configuration, the material as described in the forgoing may be used wherein as a preferable example, one of diffusion patterns may be formed using TiO$_2$ having excellent refraction rate and the other diffusion pattern may be formed using CaCO$_3$, having excellent light stability and color sense, together with TiO$_2$ and the light shielding pattern may be formed therebetween using Al shaded excellently, and thereby ensuring light efficiency and uniformity through a triple configuration. Specially, CaCO$_3$ is used for deducting an expose of yellow light and implementing white light and thereby implementing light of more stable efficiency and further in addition to CaCO$_3$, BaSO$_4$, Al$_2$O$_3$ and Silicon of inorganic material having a large particle size and similar configuration may be used.

Meanwhile, the optical pattern may be formed by adjusting pattern density in consideration of light efficiency in such manner that as it is far away from the light emission direction of the LED light source, a pattern density is lowed. Further, in the back light configuration as described in the forgoing according to the present invention, a surface treatment layer (not shown) enabling rough patterns of the optical patterns to be flat may be further provided between the resin layer 140 and the optical patterns 151 formed on the surface of the diffusion plate 150, and thereby excluding differences between a dark part and a light part which are caused from an air layer formed by a step difference occurred when the optical patterns 151 of the diffusion plate is adhered to the resin layer 140 placed on the lower part of the optical pattern wherein the surface treatment layer is formed to cover step difference of the entire optical pattern 151 as a flat layer. Additionally, the surface treatment layer may be same material as the resin layer 140 to improve an adhering property.

FIG. 11 is a plane view illustrating configurations of the reflection film and the reflection pattern according to the present invention. That is, the reflection film 120 according to the present invention may be laminated on the printed circuit board and the LED light source 111 may be exposed outside through a hole formed on the reflection film. In a case where the LED light source is formed as the side view LED, the number of the light source can be greatly decrease and further the reflection patterns 130 may be provided to greatly improve reflection rate of light for decreasing the decreasing rate number of the light source.

The reflection patterns may be formed in the light emission direction of the LED light source, as shown in an example of FIG. 11, and specially the patterns are arranged in such a manner that as the reflection patterns are far away from the light emission direction of the LED light source, pattern density thereof increases. That is, the pattern density of a second area 132 disposed farther from the light emission direction than a first area 131 is higher than that of the first area. Of course, configuration of the patterns may be varied depending on a designer's intention. Addition, the patterns may be formed through a printing method using a reflection ink comprising one of $TiO_2$ and $Al_2O_3$.

FIG. 12 is view illustrating an operational state of the back light configuration according to the present invention.

As shown in FIG. 12, the back light unit according to the present invention light is emitted sideward from the side view LED 111 and is reflected and diffused through the resin layer 140 formed instead of the prior light guide plate, and reflection rate is increases further through the reflection film 120 and the reflection pattern 130 and thereby allowing light to be guided toward a front direction. The light passing through the resin layer 140 is diffused or shielded through the optical patterns 151 formed on the diffusion plate 150 and the refined light L is entered to the LCD panel as white light through optical sheet of a prism sheet.

As described in the forgoing, in the back light unit according to the present invention, the light guide plate is removed and light is emitted from the side view LED as light supply source, and light is guided through diffusion and reflection using a resin layer, and thereby thinning the back light unit and decreasing number of light source. Further, luminance decreasing and light uniformity problems may be supplemented through the optical patterns such as the reflection pattern, the light shielding pattern and the diffusion pattern and thereby implementing uniform image.

INDUSTRIAL APPLICABILITY

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A back light unit comprising:
   a plurality of LED light sources on a printed circuit board;
   a resin layer which is laminated on the printed circuit board and buries the plurality of LED light sources, wherein the resin layer comprises 10-21% of an oligomer, 30-63% of a monomer, and 1.5-6% of additives;
   a diffusion plate disposed on an upper surface of the resin layer; and
   an optical pattern disposed between the diffusion plate and the resin layer,
   wherein the optical pattern comprises a light shielding pattern and a diffusion pattern on the light shielding pattern, the diffusion pattern comprising a material different from that of the light shielding pattern and having a pattern shape different from that of the light shielding pattern, such that the optical pattern controls the extent of light that is diffused and light that is shielded;
   wherein the light shielding pattern has a pattern shape having a recess and a protrusion in a light emission direction,
   wherein the diffusion pattern shields, reflects, and diffuses light;
   wherein the light shielding pattern shields and reflects light,
   wherein the diffusion pattern is in contact with a bottom surface of the diffusion plate,
   wherein the light shielding pattern comprises a first part being in direct physical contact with a part of the diffusion pattern and vertically overlapped with the part of the diffusion pattern, and a second part vertically overlapped with the LED light source; and
   wherein the diffusion pattern is not overlapped with the LED light source and comprises a first diffusion pattern entirely vertically overlapped with the light shielding pattern, and a second diffusion pattern partially vertically overlapped with the light shielding pattern.

2. The back light unit of claim 1, wherein the oligomer is a urethane acrylate oligomer, and
   wherein the monomer is formed with a mixture comprising 10-21% of IBOA (isobornyl acrylate). 10-21% of HBA (hydroxybutyl acrylate) and 10-21% of HEMA (hydroxyethyl methacrylate).

3. The back light unit of claim 1, wherein the diffusion pattern further comprises a third diffusion pattern not vertically overlapped with the light shielding pattern.

4. The back light unit of claim 1, wherein the resin layer further comprises the additives containing a photo initiator of 1-5% and an anti-oxidant of 0.5-1% on the basis of the total weight of the resin layer.

5. The back light unit of claim 1, wherein the LED light sources comprise a side view light emitting diode (LED).

6. The back light unit of claim 1, which further comprises a reflection film laminated on an upper surface of the printed circuit board.

7. The back light unit of claim 6, wherein the reflection film further comprises a reflection pattern for reflecting light formed on a surface of the reflection film.

8. The back light unit of claim 7, wherein the reflection pattern is printed-patterned using a reflection ink comprising one selected from a group consisting of $TiO_2$, $CaCO_3$, $BaSO_4$, $Al_2O_3$, Silicon and PS.

9. The back light unit of claim 1, wherein the diffusion pattern is formed using a light shielding ink comprising one or more selected from a group consisting of $TiO_2$, $CaCO_3$, $BaSO_4$, $Al_2O_3$ and silicon, and the light shielding pattern is formed using a light shielding ink comprising Al or a mixture of Al and $TiO_2$.

10. The back light unit of claim 1, wherein the resin layer further comprises beads of 0.01-0.3 wt % on the basis of the total weight of the resin layer for increasing light reflection.

11. The back light unit of claim 10, wherein the beads are one or more selected from a group of silicon, silica, glass bubble, PMMA, urethane, Zn, Zr, $Al_2O_3$, and acryl.

12. A liquid crystal display provided with a back light, using a side view light emitting diode (LED) as a light source and a resin layer as a light guide plate, which is laminated on a printed circuit board in a structure of burying a light source, and comprising:
   a reflection film having a reflection pattern laminated on an upper surface of the printed circuit board, and
   a diffusion plate that is formed on an upper surface of the resin layer and printed with an optical pattern that partially shields, partially reflects, and partially diffuses an emitted light;
   wherein the optical pattern is disposed between the diffusion plate and the resin layer, and comprises a light shielding pattern and a diffusion pattern on the light shielding pattern, the diffusion pattern comprising a material different from that of the light shielding pattern and having a pattern shape different from that of the light shielding pattern, such that the optical pattern controls the extent of the light that is diffused and the light that is shielded;

wherein the light shielding pattern has a pattern shape having a recess and a protrusion in a light emission direction, wherein the diffusion pattern shields, reflects, and diffuses light;

wherein the light shielding pattern shields and reflects light;

wherein the diffusion pattern is in contact with a bottom surface of the diffusion plate, wherein the light shielding pattern comprises a first part being in direct physical contact with a part of the diffusion pattern and vertically overlapped with the part of the diffusion pattern, and a second part vertically overlapped with the LED light source, and wherein the diffusion pattern is not overlapped with the LED light source and comprises a first diffusion pattern entirely vertically overlapped with the light shielding pattern, and a second diffusion pattern partially vertically overlapped with the light shielding pattern.

13. The liquid crystal display of claim 12, which further comprises a prism sheet or protection sheet laminated on an upper part of the diffusion plate.

* * * * *